(12) United States Patent  
Gilula et al.

(10) Patent No.: US 11,301,497 B2  
(45) Date of Patent: Apr. 12, 2022

(54) COMPOSABLE DATA MODEL

(71) Applicant: KeyArk, Inc., Foster City, CA (US)

(72) Inventors: Mikhail Gilula, Foster City, CA (US); Andrey Belyaev, Milpitas, CA (US)

(73) Assignee: Key Ark, Inc., Foster City, CA (US)

( * ) Notice: Subject to any disclaimer, the term of this patent is extended or adjusted under 35 U.S.C. 154(b) by 66 days.

(21) Appl. No.: 16/840,937

(22) Filed: Apr. 6, 2020

(65) Prior Publication Data

US 2021/0311965 A1 Oct. 7, 2021

(51) Int. Cl.
*G06F 16/00* (2019.01)
*G06F 16/28* (2019.01)
*G06F 16/23* (2019.01)

(52) U.S. Cl.
CPC ........ *G06F 16/285* (2019.01); *G06F 16/2365* (2019.01)

(58) Field of Classification Search
CPC .... G06F 16/221; G06F 16/2282; G06F 16/24; G06F 16/288; G06F 16/211; G06F 16/2291; G06F 16/24575; G06F 16/248; G06F 16/284; G06F 16/285; G06F 8/34; G06F 16/185; G06F 21/602; G06F 21/6245; G06F 21/6254; G06F 21/78; G06F 40/103; G06F 40/18; G06F 8/20; G06F 8/71; G06F 16/212; G06F 16/2445; G06F 16/245; G06F 11/1438; G06F 11/25; G06F 11/3006; G06F 11/3051; G06F 11/3086; G06F 11/3442; G06F 11/3457; G06F 17/40; G06F 2201/815; G06F 2201/875; G06F 16/1774; G06F 16/2228; G06F 16/2428; G06F 16/24554; G06F 16/24568; G06F 16/951; G06F 9/5072; G06F 16/2365; G06F 16/24547; G06F 16/28

See application file for complete search history.

(56) References Cited

U.S. PATENT DOCUMENTS

| | | |
|---|---|---|
| 8,312,039 B2 | 11/2012 | Gilula |
| 2002/0083039 A1 | 6/2002 | Ferrari et al. |
| 2004/0143644 A1 | 7/2004 | Berton et al. |
| 2011/0307504 A1 | 12/2011 | Agrawal et al. |
| 2014/0025702 A1 | 1/2014 | Curtiss et al. |
| 2015/0106458 A1* | 4/2015 | Marovets ............. H04L 51/066 709/206 |
| 2015/0112961 A1 | 4/2015 | Jiang et al. |
| 2017/0052766 A1* | 2/2017 | Garipov ............. G06F 16/2291 |

(Continued)

*Primary Examiner* — Shyue Jiunn Hwa
(74) *Attorney, Agent, or Firm* — Fish & Richardson P.C.

(57) ABSTRACT

Methods, systems, and apparatus, including computer programs encoded on computer storage media, for a composable data model. One of the methods includes receiving an input data file defining: (i) a catalog that defines one or more named elements, one or more named compositions, and one or more named multi-compositions, and (ii) a catalog store that is an instance of the catalog; and generating a data object representing the catalog store in a database, comprising generating data objects respectively representing i) every instance of a named element specified by the catalog store defined in the input data file, ii) every instance of a named composition specified by the catalog store defined in the input data file, and iii) every instance of a named multi-composition specified by the catalog defined in the input data file.

20 Claims, 3 Drawing Sheets

(56) References Cited

U.S. PATENT DOCUMENTS

| | | |
|---|---|---|
| 2018/0268062 A1 | 9/2018 | Gilula |
| 2020/0026741 A1* | 1/2020 | Gilula |
| 2020/0327252 A1* | 10/2020 | Mcfall ................. G06F 21/602 |
| 2021/0004524 A1* | 1/2021 | Takahashi ............. G06F 16/168 |

* cited by examiner

```
 1  DROP CATALOG _META;                                                          Meta-Catalog 110
 2  CREATE CATALOG _META;
 3  CREATE KEYOBJECT _NAME CHAR IN CATALOG _META;
 4  CREATE KEYOBJECT _URL CHAR IN CATALOG _META;
 5  CREATE KEYOBJECT _TYPE CHAR IN CATALOG _META;
 6  CREATE KEYOBJECT _FORMAT CHAR IN CATALOG _META;
 7  CREATE KEYOBJECT _MULT_UNIT CHAR IN CATALOG _META;                                       112
 8  CREATE KEYOBJECT _MULT {_NAME,_MULT_UNIT} IN CATALOG _META;
 9  CREATE KEYOBJECT _MULTS {_MULT MULTIPLE} IN CATALOG _META;
10  CREATE KEYOBJECT _ELEM {_NAME,_TYPE,_FORMAT} IN CATALOG _META;                           114
11  CREATE KEYOBJECT _ELEMS {_ELEM MULTIPLE} IN CATALOG _META;
12  CREATE KEYOBJECT _MEMBERS {_NAME MULTIPLE} IN CATALOG _META;                             116
13  CREATE KEYOBJECT _COMP {_NAME,_MEMBERS} IN CATALOG _META;
14  CREATE KEYOBJECT _COMPS {_COMP MULTIPLE} IN CATALOG _META;
15  CREATE KEYOBJECT _STORE {_NAME,_URL} IN CATALOG _META;                                   118
16  CREATE KEYOBJECT _CATALOG {_NAME,_URL,_COMPS,_ELEMS,_MULTS,_STORE}
17                  IN CATALOG _META;
18
```

```
 1  {_CATALOG : {                                                                 First Catalog 120
 2   _NAME : 'Cartoons',
 3   _URL  : 'http://www.keyark.com/Cartoons',
 4   _COMPS : {_COMP :{_NAME:'MOVIE',_MEMBERS:{_NAME:'CAST',_NAME:'DIRECTORS',
 5                     _NAME:'TITLE',_NAME:'BUDGET',_NAME:'RELEASE_DATE'}}},
 6   _MULTS : {_MULT :{_NAME:'CAST',_MULT_UNIT:'PERSON'},
 7             _MULT :{_NAME:'DIRECTORS',_MULT_UNIT:'PERSON'}},
 8   _ELEMS : {_ELEM : {_NAME : 'PERSON',_TYPE : '_char'},
 9             _ELEM : {_NAME : 'TITLE',_TYPE : '_char'},
10             _ELEM : {_NAME : 'BUDGET',_TYPE : '_number'},
11             _ELEM : {_NAME : 'RELEASE_DATE',_TYPE :
12              '_date',_FORMAT:'YYYY-MM-DD'}}
13  {_STORE:{_NAME : 'Classical_Cartoons',                                  First Catalog Store 130
14   {MOVIE:{CAST:{PERSON:'Wise Little Hen',PERSON:'Donald Duck'},
15    DIRECTORS:{PERSON:'Wilfred Jackson'},RELEASE_DATE:'1934-01-01',TITLE:'The
16    Wise Little Hen'}},
17   {MOVIE:{CAST:{PERSON:'Mickey Mouse',PERSON:'Minnie Mouse',PERSON:'Peg-Leg
18    Pete'},
19         DIRECTORS:{PERSON:'Ub Iwerks',PERSON:'Walt Disney'},
20         RELEASE_DATE:'1929-01-01',
21         TITLE:'Steamboat Willie',
22         BUDGET:4986}}
23   }},
22   {_STORE:{_NAME : 'Cartoons',_URL:'http://www.keyark.com/cartoons_data'}}  ← 140
23  }
```

FIG. 1

COMPOSABLE DATA MODEL

BACKGROUND

This specification relates to database query languages. Typically, a database is either a relational database or a non-relational database. A relational database represents and stores data in tables that have defined relationships, and is often queried using a query language, e.g., Structured Query Language (SQL). A non-relational database does not enforce relationships between tables, but rather stores data in collections that each have their own namespaces. For example, the collections of a non-relational database can be stored in respective documents, e.g. JavaScript Object Notation (JSON) documents.

Relational databases are highly structured and organized, but can be overly complex and difficult to scale, and have very strict requirements that are incompatible with some data. Non-relational databases, on the other hand, are a lot more flexible and scalable, but lack the structure and relationships of the relational data model.

SUMMARY

This specification describes a composable data model that can be used to efficiently represent and store data.

Data represented using a composable data model can be stored as instances of one or more catalogs, where each catalog defines a particular structure for the data. Each catalog is composed of one or more key objects of different types. The types of key object can include "elements," "compositions," and "multi-compositions." Some types of key objects, e.g. "compositions" and "multi-compositions," are themselves composed of other key objects. Thus, arbitrarily large catalog instances can be composed using the elemental key objects provided by a composable data model. An instance of a catalog is called a "catalog store," and includes instances of the key objects defined by the catalog.

The data stored in a catalog store of a catalog using a composable data model can be retrieved by submitting queries that identify one or more of the key objects instances of the catalog store. A system can then generate an output that includes each queried key object instance of the catalog store, where the output is itself a new catalog store of the catalog.

Particular embodiments of the subject matter described in this specification can be implemented so as to realize one or more of the following advantages.

Using techniques described in this specification, data can be represented and stored more efficiently than using some existing techniques. In particular, data can be stored in a more compact representation than if the same data were stored using some existing SQL- and JSON-based systems. Furthermore, a system can generate new data objects using a single constructor, which is a sparser construction mechanism than many relational and non-relational data models. The single constructor can include just a few characters, allowing the representation to have even more informational capacity per symbol.

A composable data model can have many of the benefits of both a relational and non-relational data model without many of the drawbacks. For example, using catalog definitions, a composable data model can maintain a particular structure and hierarchy of relationships within catalog stores, while allowing flexibility and scalability in composing key objects to generate new catalogs and catalog stores.

Furthermore, a composable data model can be universally applicable to all data. That is, the data stored using any relational or non-relational schema can be compatible with the composable data model, and thus can be transformed to fit the composable data model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example input data file that defines a composable data model expressed in a composable data model language.

Like reference numbers and designations in the various drawings indicate like elements.

DETAILED DESCRIPTION

Figure 2:
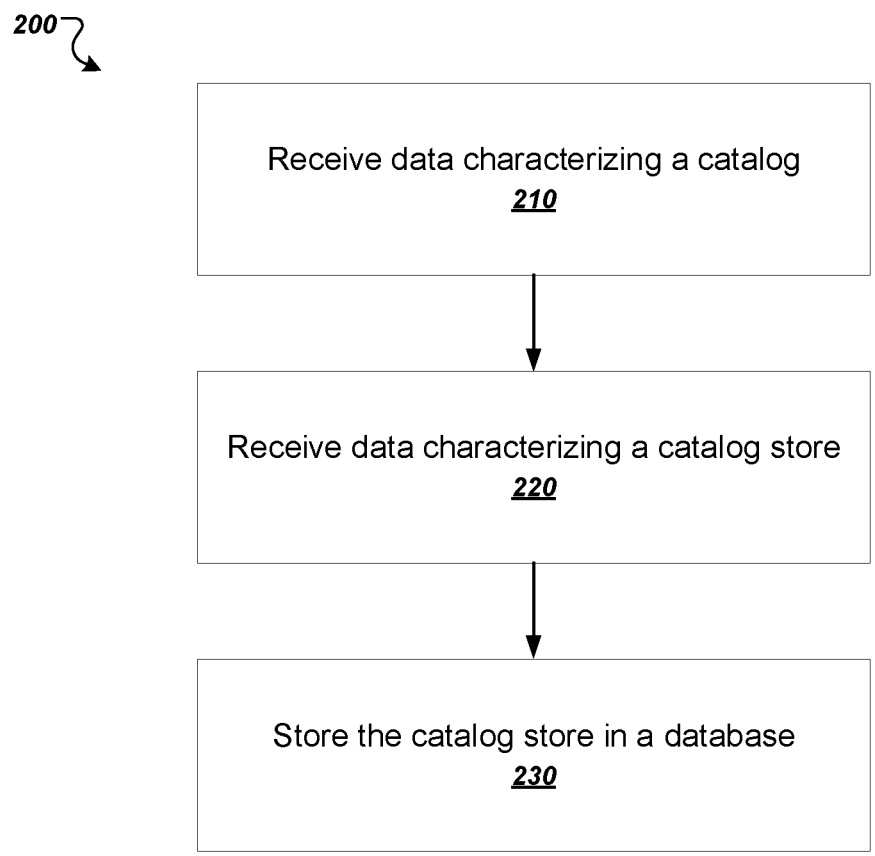
FIG. 2 is a flowchart of an example process for storing data using a composable data model.

FIG. 1 illustrates an example input data file 100 that defines a composable data model expressed in a composable data model language. The input data file 100 has multiple sections that respectively define a meta-catalog 110 and a first catalog 120. The meta-catalog 110 defines a structure that all catalogs, including the first catalog 120, of the composable data model must have. In general, the input data file 100 can define multiple different catalogs that each have the structure defined by the meta-catalog 110.

Generally, data represented using a composable data model is stored in instances of one or more catalogs, where each catalog defines a particular structure for the data stored in the instances of the catalog, which may be referred to as "catalog stores." Each catalog includes definitions for i) one or more elements, ii) one or more compositions, and iii) one or more multi-compositions. In this specification, elements, compositions, and multi-compositions will be collectively referred to as "key objects," referencing the fact that each type of data has a name and corresponding data.

The composable data model of FIG. 1 defines three different types of key objects: elements, compositions, and multi-compositions.

An element is the lowest-level data object described in the input data file 100. An element defines a single item of data that has a name. That is, each instance of an element is a key-object pair, where the key is the name of the element.

A composition defines a named set of key objects. That is, each instance of a composition is a key-object pair where the key is the name of the composition and the object is a set of instances of one or more elements, multi-compositions, and/or other compositions defined by the composition. Each key object instance in an instance of a composition is predefined in the catalog of the composition.

A multi-composition defines a named set of one or more instances of the same key object. That is, an instance of a multi-composition is a key-object pair where the key is the name of the multi-composition and the object is a set of one or more instances of the same element, composition, or multi-composition. There can be arbitrarily many instances of the respective key object in a multi-composition instance.

A catalog store is a particular instance of a catalog defined by a meta-catalog. That is, a catalog store is a data object that includes one or more instances of key objects, where the structure of the catalog store and the names of the key-objects in the catalog store are defined by the corresponding catalog.

Referring back to FIG. 1, the meta-catalog 110 includes data that defines elements, compositions, and multi-compositions.

The data 114 defines a structure for the elements of the data model described in the input data file 100. In particular, each element in each catalog of the data model can have a name, a data type, and a predefined data format. In some implementations, each element defined in a catalog of the data model must have every item that is defined in the data 114 of the meta-catalog 110, e.g., must have all three of: a name, a data type, and a predefined data format. In some other implementations, one or more of the items defined in the data 114 can be optional. The 'name' item is a special case, as each key object defined in a catalog must have a name. However, the 'name' item defined in the data 114 does not necessarily have to be defined by the "_NAME" syntax.

The data 116 defines a structure for compositions of the data model described in the input data file 100. In particular, line 13 of the meta-catalog 110 defines that each composition of the data model must have a name and a list of members, and line 12 of the meta-catalog 110 defines that the list of members will be a set of respective names of the multiple key objects that can be included in the composition.

The data 112 defines a structure for multi-compositions of the data model described in the input data file 100. In particular, line 8 of the meta-catalog 110 defines that each multi-composition of the data model must have a name and a mult-unit, and line 7 of the meta-catalog 110 defines that a mult-unit is the name of a particular key object of the catalog. That is, the multi-composition can include one or more instances of the key object corresponding to the mult-unit.

The data 118 defines an overall structure for each catalog and each catalog store of the data model described in the input data file 100. In particular, lines 16-17 of the meta-catalog 110 define that each catalog of the data model can have a name, a URL, one or more compositions, one or more elements, one or more multi-compositions, and one or more catalog stores of the catalog. Similarly, line 15 of the meta-catalog 110 defines that each catalog store of the data model can have a name and a URL, in addition to instances of the key-objects defined by the corresponding catalog. In some implementations, one or more of the items defined in the data 118 can be optional, e.g., in some implementations not every catalog and catalog store must have a URL. As before, the 'name' item is a special case, as each catalog and catalog store in a composable data model must have a name.

As discussed above, the first catalog 120 of the data model described in the input data file 100 has a structure that is defined by the meta-catalog 110. In this example, the first catalog 120 includes all of the items defined in lines 16-17 of the meta-catalog 110. The name of the first catalog 120 is "Cartoons," as defined in line 2 of the first catalog, and the first catalog 120 has a URL as defined in line 3 of the first catalog.

Lines 8-11 of the first catalog 120 define the elements that can be included in catalog stores of the first catalog 120. In particular, catalog stores of the first catalog 120 can include a "person" element, a "title" element, a "budget" element, and a "release date" element. In this example, each of the named elements of the first catalog 120 have a data type, but not every element has a predefined data format. Only the "release date" element is constrained to a particular predefined data format, in this case 'YYYY-MM-DD.'

Lines 6-7 of the first catalog 120 define the multi-compositions that can be included in catalog stores of the first catalog 120. In particular, catalog stores of the first catalog 120 can include a "cast" multi-composition and a "directors" multi-composition that are each composed of one or more instances of the "person" element of the first catalog 120.

Lines 4-5 of the first catalog 120 define the compositions that can be included in catalog stores of the first catalog 120. In this case, the first catalog 120 only defines one composition, which is a "movie" composition whose members are the "cast" multi-composition, the "directors" multi-composition, the "title" element, the "budget element," and the "release date" element of the first catalog 120. In some implementations, each instance of a composition is require to include exactly one instance of each member of the composition. In some other implementations, one or more members of a composition can be optional, so that instances of the composition can include either one or zero of the optional members of the composition.

The input data file 100 includes two catalog stores corresponding to the first catalog 120: a first catalog store 130 and a second catalog store 140.

The first catalog store 130, named "Classical Cartoons," includes two instances of the "movie" composition. The first instance of the "movie" composition includes i) the "cast" multi-composition, which itself includes two "person" elements, ii) the "directors" multi-composition, which itself includes one "person" element, iii) the "release date" element, and iv) the "title" element. The first catalog store 130 does not include the "budget" element; that is, in this example the "budget" element in the members list of the "movie" composition is optional. The second instance of the "movie" composition in the first catalog store 130, corresponding to the movie titled "Steamboat Willie," includes an instance of every member of the "movie" composition.

The second catalog store 140 only defines a name and a URL, and does not include any instances of key objects defined in the first catalog 120. That is, in this example, each key object defined in the first catalog is optional.

Every key object of the first catalog 120 is defined by the same constructor, which affords the data model described in the input data file 100 a simplicity that can make parsing the input data file 100 computationally efficient and universally adaptable. In this specification, a "constructor" refers to a character pattern in the composable data model language that defines key objects.

The constructor that is used to define each key object in the first catalog 120 includes a set of four characters: "{", "}", ":", and ",". The "{" character is an opening constructor character, which delineates the beginning of the definition of a particular key object or a particular instance of a key object. The "}" character is a closing constructor character, which delineates the end of the definition of a particular key object or a particular instance of a key object. The ":" is a name definition delimiter, which separates the name of a key object or key object instance and the data of the key object or the key object instance. The "," is a sequence delimiter, which separates different key objects or key object instances in a sequence. The fact that the constructor is a single set of a few characters allows the data objects defined in the input data file 100 to be efficiently stored, with a high informational capacity per symbol. That is, data objects in the data model can be stored using less memory than equivalent data objects, i.e., data objects representing the same information, in a relational data model or a non-relational data model.

FIG. 2 is a flowchart of an example process 200 for storing data using a composable data model. The process 200 can be implemented by one or more computer programs installed on one or more computers and programmed in accordance with this specification. For convenience, the process 200 will be described as being performed by a system of one or more computers.

The system receives data characterizing a catalog (step 210). The system can receive the data, for example, from a user device.

The system receives data characterizing a catalog store (step 220). The catalog store is an instance of the catalog received in step 210; that is, the catalog store has a structure that is defined by the catalog. The catalog store specifies instances of at least one of: i) a named element defined by the catalog, ii) a named composition defined by the catalog, or iii) a named multi-composition defined by the catalog.

In some implementations, the data characterizing the catalog and the data characterizing the catalog store can be received at the same time; for example, the system can receive data characterizing both the catalog and the catalog store in the same input data file, e.g. the input data file 100 depicted in FIG. 1. In some other implementations, the system can receive the data characterizing the catalog at a first time, and the data characterizing one or more catalog stores that are instances of the catalog at a second time that is after the first time. For example, a user can define how data from a particular source will be structured using the catalog, and later the data can be received from the particular source in the form of a catalog store corresponding to the predefined catalog.

The system stores the catalog store in a database (step 230). In order to store the catalog store in the database, the system can parse the data defining the catalog store and the data defining the corresponding catalog. For example, the system can parse an input data file, e.g. the input data file 100 depicted in FIG. 1, using the predefined constructor of the input data file.

Storing the catalog store includes storing i) every instance of a named element specified by the catalog store, ii) every instance of a named composition specified by the catalog store, and iii) every instance of a named multi-composition specified by the catalog.

Figure 3:
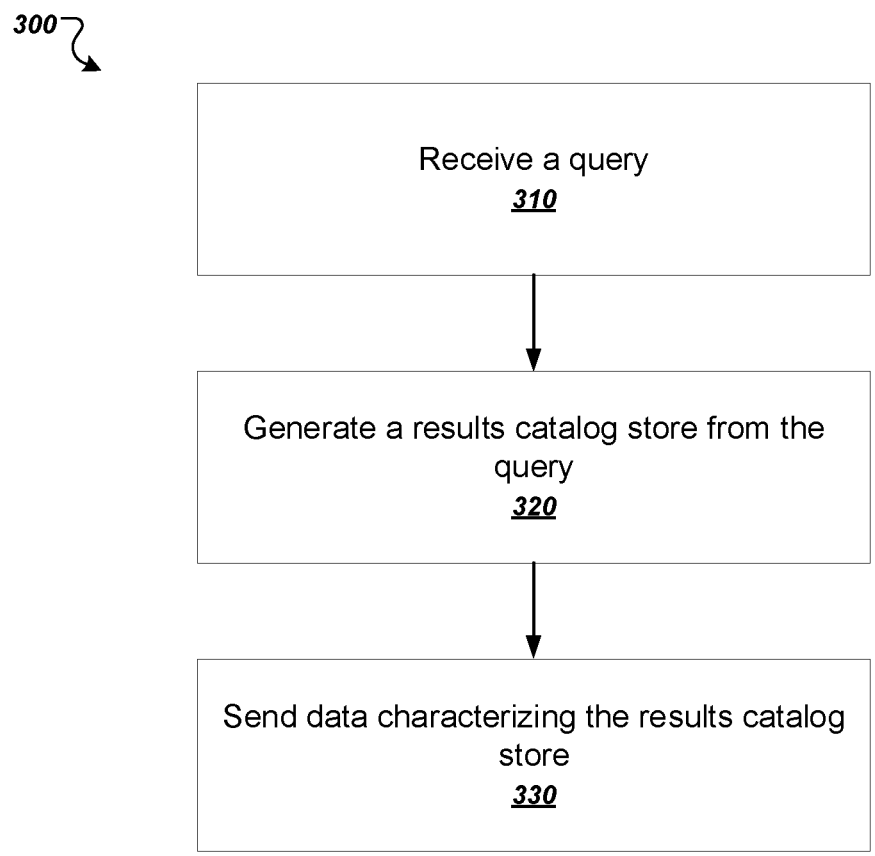
FIG. 3 is a flowchart of an example process for querying data using a composable data model.

FIG. 3 is a flowchart of an example process 300 for querying data using a composable data model. The process 300 can be implemented by one or more computer programs installed on one or more computers and programmed in accordance with this specification. For convenience, the process 300 will be described as being performed by a system of one or more computers.

The system receives a query (step 310). The system can receive the query, for example, from a user device. The query includes an identification of a particular catalog store to query, and an identification of one or more of: i) a particular element of the catalog store, ii) a particular composition of the catalog store, or iii) a particular multi-composition of the catalog store.

For example, the query can include a request to retrieve every key object that has a particular name. Referring to the first catalog store 130 depicted in FIG. 1, the query might request to retrieve every multi-composition named "directors." In this example, the response would include i) the "directors" multi-composition that includes "Wilfred Jackson" and ii) the "directors" multi-composition that includes "Ub Iwerks" and "Walt Disney."

As another example, the query can include a request to retrieve every key object that has a particular value. Referring to the first catalog store 130 depicted in FIG. 1, the query might request to retrieve every "movie" composition that includes "Donald Duck" in the "cast" multi-composition of the "movie" composition. In this example, the response would include the first "movie" composition, because "Donald Duck" matches the value for the "cast" multi-composition.

In some implementations, the query can include an identification of multiple different catalog stores. In some such implementations, each key object identified in the query can correspond to a particular one of the identified catalog stores; that is, the query requests the identified key object only from the corresponding catalog store. In some other such implementations, each key object identified can be requested to be retrieved from every identified catalog store.

In some implementations, each identification of a key object can include data characterizing a location of the key object in the topology of the catalog store. That is, the received query might condition the retrieval of one or more key objects according to how the key objects are nested within other key objects in the catalog store. For example, referring to the first catalog store 130 depicted in FIG. 1, the query might request to retrieve every "person" element that is in a "directors" multi-composition. In this example, the response would not include the "person" elements that are in a "cast" multi-composition.

In some other implementations, the query does not include any information about the topology of the catalog store. That is, a user can construct a query without any knowledge of the topology of the catalog store.

The system generates a results catalog store from the query (step 320). The results catalog store is a catalog store that includes every key object of the catalog instance that was requested in the query.

The results catalog store is itself an instance of the catalog corresponding to the queried catalog store. This is because the results catalog store is entirely composed of key objects from the queried catalog store, and the key objects of the queried catalog store necessarily follow the structure of the catalog corresponding to the queried catalog store. Thus, the response to a query of a catalog store that is an instance of a catalog is itself an instance of the catalog.

The results catalog store specifies instances of at least one of: i) a named element of the catalog store identified by the query, ii) a named composition of the catalog store identified by the query, or iii) a named multi-composition of the catalog store identified by the query. If the catalog store does not include any key objects identified by the query, then the results catalog store can be empty.

In some implementations, each key object instance in the results catalog store can include data characterizing the location of the corresponding key object instance in the queried catalog store. For example, referring to the first catalog store 130 depicted in FIG. 1, if the query requested the system to retrieve every "person" element instance, then the results catalog store could include data characterizing, for each "person" element instance in the results catalog store, i) whether the corresponding "person" element instance in the first catalog store 130 was in a "cast" multi-composition instance or a "director" multi-composition instance and ii) the "movie" composition instance that the "person" element instance was in. As a particular example, each key object instance in the results catalog store can be associated with an ordered list of other key object instances that are the "parents" of the corresponding key object instance in the catalog store, i.e., the other key object instances that the corresponding key object instance in the catalog store is nested within.

The system sends data characterizing the results catalog store to the system that submitted the query (step 330). For example, if the query was received from a user device, then the system sends the results catalog store to the user device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving an input data file defining:
    (i) a catalog that defines:
      (a) one or more named elements,
      (b) one or more named compositions, and
      (c) one or more named multi-compositions,
    wherein each named composition comprises one or more members, wherein each member is i) a named element of the catalog, ii) a named composition of the catalog, or iii) a named multi-composition of the catalog, and
    wherein each named multi-composition comprises a member that is i) a named element of the catalog, ii) a named composition of the catalog, or iii) a named multi-composition of the catalog and wherein an instance of the named multi-composition can have multiple instances of the member; and
    (ii) a catalog store that is an instance of the catalog, wherein the catalog store specifies instances of at least one of: i) a named element defined by the catalog, ii) a named composition defined by the catalog, or iii) a named multi-composition defined by the catalog; and
  generating a data object representing the catalog store in a database, comprising generating data objects respectively representing i) every instance of a named element specified by the catalog store defined in the input data file, ii) every instance of a named composition specified by the catalog store defined in the input data file, and iii) every instance of a named multi-composition specified by the catalog defined in the input data file.

Embodiment 2 is the method of embodiment 1, wherein the input data file further defines:
  a meta-catalog that defines types of elements, compositions, and multi-compositions that can occur in the catalog.

Embodiment 3 is the method of any one of embodiments 1 or 2, wherein every element, composition, and multi-composition is defined in the input data file by a same constructor.

Embodiment 4 is the method of embodiment 3, wherein the same constructor is a same set of characters.

Embodiment 5 is the method of embodiment 4, wherein the input data file includes only four special characters, the characters including an opening constructor character, a closing constructor character, a name definition delimiter, and a sequence delimiter.

Embodiment 6 is the method of embodiment 5, wherein the opening constructor character is "{", the closing constructor character is "}", the name definition delimiter is ":", and the sequence delimiter is ",".

Embodiment 7 is the method of any one of embodiments 1-6, wherein the input data file is compatible with the data model of any relational or key-value schema.

Embodiment 8 is the method of any one of embodiments 1-7, further comprising:
  receiving, from a user device, a query comprising an identification of the catalog store and a respective identification of one or more of: i) a particular element of the catalog store, ii) a particular composition of the catalog store, or iii) a particular multi-composition of the catalog store;
  generating a results catalog store, wherein the results catalog store specifies instances of at least one of i) a named element of the catalog store identified by the query, ii) a named composition of the catalog store identified by the query, or iii) a named multi-composition of the catalog store identified by the query; and
  sending data characterizing the results catalog store to the user device.

Embodiment 9 is the method of embodiment 8, wherein:
  the query further comprises an identification of a second catalog store; and
  the results catalog store also specifies instances of at least one of: i) a named element of the second catalog store identified by the query, ii) a named composition of the second catalog store identified by the query, or iii) a named multi-composition of the second catalog store identified by the query.

Embodiment 10 is the method of any one of embodiments 8 or 9, wherein the query further comprises, for one or more identified elements, compositions, or multi-compositions of the catalog store, an identification of a particular location in a topology of the catalog store.

Embodiment 11 is the method of any one of embodiments 8-10, wherein the results catalog store comprises, for each key object instance in the results catalog store, an identification of a location of the corresponding key object instance in the catalog store.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    receiving an input data file defining:
        (i) a catalog that defines:
            (a) one or more named elements,
            (b) one or more named compositions, and
            (c) one or more named multi-compositions,
        wherein each named element defines a data item, and wherein instances of the named element are instances of the defined data item,
        wherein each named composition defines one or more members, wherein each member is i) a named element of the catalog, ii) a named composition of the catalog, or iii) a named multi-composition of the catalog, and wherein instances of the named composition include instances of one or more of the defined members, and
        wherein each named multi-composition defines a member that is i) a named element of the catalog, ii) a named composition of the catalog, or iii) a named multi-composition of the catalog, and wherein instances, of the named multi-composition can include multiple instances of the defined member; and
    (ii) a named catalog store that is an instance of the catalog, wherein the named catalog store specifies: i) an instance of a first named element defined by the catalog, ii) multiple different instances of a first named composition defined by the catalog, and iii) an instance of a first named multi-composition defined by the catalog,
        wherein the instance of the first named multi-composition comprises the multiple different instances of the first named composition;
    generating a data object representing the named catalog store in a database, comprising generating data objects respectively representing i) the instance of the first named element specified by the named catalog store defined in the input data file, ii) the multiple different instances of the first named composition specified by the named catalog store defined in the input data file, and iii) the instance of the first named multi-composition specified by the named catalog store defined in the input data file;
    receiving, from a user device, a query for the named catalog store, wherein the query identifies one or more of: i) the instance of the first named element specified in the catalog store, ii) one or more of the multiple different instances of the first named composition specified in the catalog store, or iii) the instance of the first named multi-composition specified in the catalog store; and
    in response to receiving the query, providing, to the user device, data representing the respective instances, identified by the query, of one or more of the first named element, the first named composition, or the first named multi-composition specified in the catalog store.

2. The method of claim 1, wherein the input data file further defines:
    a meta-catalog that defines types of elements, compositions, and multi-compositions that can occur in the catalog.

3. The method of claim 1, wherein every element, composition, and multi-composition is defined in the input data file by a same constructor.

4. The method of claim 3, wherein the same constructor is a same set of characters.

5. The method of claim 4, wherein the input data file includes only four special characters, the characters including an opening constructor character, a closing constructor character, a name definition delimiter, and a sequence delimiter.

6. The method of claim 5, wherein the opening constructor character is "{", the closing constructor character is "}", the name definition delimiter is ":", and the sequence delimiter is ",".

7. The method of claim 1, wherein the input data file is compatible with the data model of any relational or key-value schema.

8. The method of claim 1, wherein providing to the user device, data representing the respective instances, identified by the query, of one or more of the first named element, the first named composition, or the multi-composition specified in the catalog store comprises:
    generating a results catalog store, wherein the results catalog store specifies the respective instances, identified by the query, of one or more of the first named element, the first named composition or the first named multi-composition specified in the catalog store; and
    providing data representing the results catalog store to the user device.

9. The method of claim 1, wherein:
    the query further comprises an identification of a second catalog store that is a second instance of the catalog; and the method further comprises providing, in response to receiving the query and to the user device, data representing at least one of: i) an instance of a named element of the second catalog store identified by the query, ii) an instance of a named composition of the second catalog store identified by the query, or iii) an instance of a named multi-composition of the second catalog store identified by the query.

10. The method of claim 1, wherein the query further comprises, for one or more queried instances of elements, compositions, or multi-compositions of the catalog store, an identification of a particular location of the queried instances in a topology of the catalog store.

11. The method of claim 8, wherein providing, to the user device, data representing the respective instances, identified by the query, of one or more of the first named element, the first named composition, or the first named multi-composition specified in the catalog store comprises:
   providing data identifying, for each queried instance, a location of the queried instance in the catalog store.

12. A system comprising one or more computers and one or more storage devices storing instructions that are operable, when executed by the one or more computers, to cause the one or more computers to perform operations comprising:
   receiving an input data file defining:
      (i) a catalog that defines:
         (a) one or more named elements,
         (b) one or more named compositions, and
         (c) one or more named multi-compositions,
      wherein each named element defines a data item, and wherein instances of the named element are instances of the defined data item,
      wherein each named composition defines one or more members, wherein each member is i) a named element of the catalog, ii) a named composition of the catalog, or iii) a named multi-composition of the catalog, and wherein instances of the named composition include instances of one or more of the defined members, and
      wherein each named multi-composition defines a member that is i) a named element of the catalog, ii) a named composition of the catalog, or iii) a named multi-composition of the catalog, and wherein instances of the named multi-composition can include multiple instances of the defined member; and
      (ii) a named catalog store that is an instance of the catalog, wherein the named catalog store specifies: i) an instance of a first named element defined by the catalog, ii) multiple different instances of a first named composition defined by the catalog, and iii) an instance of a first named multi-composition defined by the catalog,
      wherein the instance of the first named multi-composition comprises the multiple different instances of the first named composition;
   generating a data object representing the named catalog store in a database, comprising generating data objects respectively representing i) the instance of the first named element specified by the named catalog store defined in the input data file, ii) the multiple different instances of the first named composition specified by the named catalog store defined in the input data file, and iii) the instance of the first named multi-composition specified by the named catalog store defined in the input data file;
   receiving, from a user device, a query for the named catalog store, wherein the query identifies one or more of: i) the instance of the first named element specified in the catalog store, ii) one or more of the multiple different instances of the first named composition specified in the catalog store, or iii) the instance of the first named multi-composition specified in the catalog store, and
   in response to receiving the query, providing, to the user device, data representing the respective instances, identified by the query, of one or more of the first named element, the first named composition, or the first named multi-composition specified in the catalog store.

13. The system of claim 12, wherein the input data file further defines:
   a meta-catalog that defines types of elements, compositions, and multi-compositions that can occur in the catalog.

14. The system of claim 12, wherein every element, composition, and multi-composition is defined in the input data file by a same constructor.

15. The system of claim 12, wherein providing, to the user device, data representing the respective instances, identified by the query, of one or more of the first named element, the first named composition, or the first named multi-composition specified in the catalog store comprises:
   generating a results catalog store, wherein the results catalog store specifies the respective instances, identified by the query, of one or more of the first named element, the first named composition or the first named multi-composition specified in the catalog store; and
   providing data representing the results catalog store to the user device.

16. The system of claim 12, wherein:
   the query further comprises an identification of a second catalog store that is a second instance of the catalog; and
   the operations further comprise providing, in response to receiving the query and to the user device, data representing at least one of: i) an instance of a named element of the second catalog store identified by the query, ii) an instance of a named composition of the second catalog store identified by the query, or iii) an instance of a named multi-composition of the second catalog store identified by the query.

17. One or more non-transitory storage media storing instructions that when executed by one or more computers cause the one or more computers to perform operations comprising:
   receiving an input data file defining:
      (i) a catalog that defines:
         (a) one or more named elements,
         (b) one or more named compositions, and
         (c) one or more named multi-compositions,
      wherein each named element defines a data item, and wherein instances of the named element are instances of the defined data item,
      wherein each named composition defines one or more members, wherein each member is i) a named element of the catalog, ii) a named composition of the catalog, or iii) a named multi-composition of the catalog, and wherein instances of the named composition include instances of one or more of the defined members, and
      wherein each named multi-composition defines a member that is i) a named element of the catalog, ii) a named composition of the catalog, or iii) a named multi-composition of the catalog, and wherein instances of the named multi-composition can include multiple instances of the defined member; and (ii) a named catalog store that is an instance of the catalog, wherein the named catalog store specifies: i) an instance of a first named element defined by the catalog, ii) multiple different instances of a first named composition defined by the catalog, and iii) an instance of a first named multi-composition defined by the catalog, wherein the instance of the first named multi-composition comprises the multiple different instances of the first named composition;

generating a data object representing the named catalog store in a database, comprising generating data objects respectively representing i) the instance of the first named element specified by the named catalog store defined in the input data file, ii) the multiple different instances of the first named composition specified by the named catalog store defined in the input data file, and iii) the instance of the first named multi-composition specified by the named catalog store defined in the input data file;

receiving, from a user device, a query for the named catalog store, wherein the query identifies one or more of: i) the instance of the first named element specified in the catalog store, ii) one or more of the multiple different instances of the first named composition specified in the catalog store, or iii) the instance of the first named multi-composition specified in the catalog store; and in response to receiving the query, providing, to the user device, data representing the respective instances, identified by the query, of one or more of the first named element, the first named composition, or the first named multi-composition specified in the catalog store.

18. The non-transitory storage media of claim 17, wherein the input data file further defines:

a meta-catalog that defines types of elements, compositions, and multi-compositions that can occur in the catalog.

19. The non-transitory storage media of claim 17, wherein providing, to the user device, data representing the respective instances, identified by the query, of one or more of the first named element, the first named composition, or the first named multi-composition specified in the catalog store comprises:

generating a results catalog store, wherein the results catalog store specifies the respective instances, identified by the query, of one or more of the first named element, the first named composition or the first named multi-composition specified in the catalog store; and providing data representing the results catalog store to the user device.

20. The non-transitory storage media of claim 17, wherein:

the query further comprises an identification of a second catalog store that is a second instance of the catalog; and the operations further comprise providing, in response to receiving the query and to the user device, data representing at least one of: i) an instance of a named element of the second catalog store identified by the query, ii) an instance of a named composition of the second catalog store identified by the query, or iii) an instance of a named multi-composition of the second catalog store identified by the query.

* * * * *